US007366148B2

(12) United States Patent
Muaddi et al.

(10) Patent No.: US 7,366,148 B2
(45) Date of Patent: Apr. 29, 2008

(54) INTRUSION DETECTION SYSTEM FOR WIRELESS NETWORKS

(75) Inventors: Albert B. Muaddi, Silver Spring, MD (US); Albert A. Tomko, New Freedom, PA (US)

(73) Assignee: John Hopkins University, Baltimore, MD (US)

( * ) Notice: Subject to any disclaimer, the term of this patent is extended or adjusted under 35 U.S.C. 154(b) by 806 days.

(21) Appl. No.: 10/477,026

(22) PCT Filed: Apr. 11, 2003

(86) PCT No.: PCT/US03/11107

§ 371 (c)(1),
(2), (4) Date: Apr. 9, 2004

(87) PCT Pub. No.: WO03/088532

PCT Pub. Date: Oct. 23, 2003

(65) Prior Publication Data

US 2004/0162995 A1 Aug. 19, 2004

Related U.S. Application Data

(60) Provisional application No. 60/371,938, filed on Apr. 11, 2002.

(51) Int. Cl.
*H04Q 7/24* (2006.01)
(52) U.S. Cl. .................. 370/338; 370/328; 370/252; 370/245; 370/352; 713/182; 713/200; 713/201; 726/23; 709/224; 709/250; 455/456.1; 455/404.2; 455/445

(58) Field of Classification Search .......... 726/23, 726/22; 709/224; 713/200, 201, 182; 370/245, 370/329, 252, 352, 338; 455/456.1, 404.2, 455/161.1, 445, 88, 85; 707/104.1
See application file for complete search history.

(56) References Cited

U.S. PATENT DOCUMENTS 5,027,383 A 6/1991 Sheffer
5,475,625 A * 12/1995 Glaschick .................. 709/224

(Continued)

OTHER PUBLICATIONS

Specifications for competitor, AirFortress Wireles Security Gateway, AF1100; Fortress Technologies, Oldsmar FL, 2002.

(Continued)

*Primary Examiner*—Marceau Milord
(74) *Attorney, Agent, or Firm*—Aisha Ahmad

(57) ABSTRACT

A method and system (FIG. 2) for facilitating detection of intruders into a wireless network, through the use of physical layer anomalies. One or more monitoring stations (22, 24, 26) can be distributed across the potential intruder's signal transmission region. They process these transmissions and extract attributes of the signals, which can then transmit to one or more fusion stations (28), which correlate the calculated attributes with stored attributes of signals of known, authorized users of the network, and transmit alert messages in the case that these signal attributes do not match those of known, authorized users. Signal attributes in accordance with the instant invention include the carrier frequency, spurious emissions, and power-on and power-down transients. Also in accordance with the instant invention are methods and systems using both direct and multipath received signal strength, signal-to-noise ratio, and geometric characteristics such as direction/angle of arrival (AOA), time of arrival, position/range, time dispersion, Doppler shift and polarization.

19 Claims, 4 Drawing Sheets

U.S. PATENT DOCUMENTS

| | | | |
|---|---|---|---|
| 5,682,142 A | 10/1997 | Loosmore et al. | |
| 6,253,064 B1 | 6/2001 | Monroe | |
| 6,266,350 B1 | 7/2001 | Ojard et al. | |
| 6,279,113 B1* | 8/2001 | Vaidya | 726/23 |
| 6,289,462 B1* | 9/2001 | McNabb et al. | 726/21 |
| 6,304,973 B1* | 10/2001 | Williams | 726/3 |
| 6,362,778 B2 | 3/2002 | Neher | |
| 6,408,391 B1* | 6/2002 | Huff et al. | 726/22 |
| 6,420,973 B2 | 7/2002 | Acevedo | |
| 6,424,673 B1 | 7/2002 | Chen et al. | |
| 6,578,147 B1* | 6/2003 | Shanklin et al. | 726/22 |
| 6,609,205 B1* | 8/2003 | Bernhard et al. | 726/22 |
| 6,629,151 B1* | 9/2003 | Bahl | 709/250 |
| 6,813,485 B2* | 11/2004 | Sorrells et al. | 455/313 |
| 7,042,852 B2* | 5/2006 | Hrastar | 370/310 |
| 7,054,296 B1* | 5/2006 | Sorrells et al. | 370/338 |
| 7,058,796 B2* | 6/2006 | Lynn et al. | 713/1 |
| 7,069,437 B2* | 6/2006 | Williams | 713/166 |
| 7,089,428 B2* | 8/2006 | Farley et al. | 726/22 |
| 7,224,678 B2* | 5/2007 | Billhartz | 370/338 |
| 2003/0149891 A1* | 8/2003 | Thomsen | 713/201 |
| 2003/0198304 A1* | 10/2003 | Sugar et al. | 375/340 |
| 2003/0221006 A1* | 11/2003 | Kuan et al. | 709/225 |
| 2004/0023674 A1* | 2/2004 | Miller | 455/462 |
| 2004/0028003 A1* | 2/2004 | Diener et al. | 370/319 |
| 2004/0028123 A1* | 2/2004 | Sugar et al. | 375/224 |

OTHER PUBLICATIONS

Brochure from competitor, Newbury Networks Inc., Boston MA, 2002.

\* cited by examiner

INTRUSION DETECTION SYSTEM FOR WIRELESS NETWORKS

CROSS REFERENCE TO RELATED APPLICATION

This application claims priority to a provisional application entitled "Wireless Network Physical-layer Intrusion Detection System" filed in the United States Patent and Trademark Office on Apr. 11, 2002 and assigned Serial No. 60/371,938, the contents of which are incorporated herein by reference.

BACKGROUND OF THE INVENTION

1. Field of the Invention

The present invention relates to an intrusion detection system for wireless networks. More specifically, it relates to a method for facilitating detection of intruders into a wireless network, through the use of physical layer anomalies.

2. Description of the Related Art

The use of wireless networks in general, and wireless local area networks (WLANs) in particular, is expanding rapidly, and is now a viable technology for retail stores, hotels, airports, museums, convention centers and college campuses. Being wireless, these networks do not benefit from the same degree of physical security enjoyed by wired networks. However, these networks require robust security measures, for example, accurate monitoring for both unintentional problems and intentional attacks, and intrusion detection systems are an important part of the network architecture.

Existing intrusion detection systems rely chiefly on network layer and high layer protocol information as inputs to the system. Use of an IPSec client, MAC address authentication, and link layer integrity checks are some conventional techniques in use. While these approaches have utility, they also have limitations. In particular, higher level techniques such as these are often not robust against certain classes of attacks, for example, datagram spoofing. Spoofing is a class of techniques involving the creation of TCP/IP packets using someone else's IP address. More specific examples include techniques such as man-in-the-middle, routing redirect, source routing, blind spoofing and flooding.

Thus, what is needed is a method and system in a wireless network for facilitating detection of intruders, which uses physical layer information, thus addressing and solving problems associated with conventional systems using only higher level information.

SUMMARY OF THE INVENTION

It is one object of the invention disclosed herein to provide a method and system for facilitating detection of intruders into a wireless network, which exploits physical-layer information. By physical layer is meant that layer of the network's protocol architecture concerned with the characteristics of the transmission medium, the nature of the signals, the data rate and related matters.

The present invention is useful in a variety of applications, where datagram and related spoofing techniques are a concern. One technique employs one or more monitoring stations which may be distributed across the potential intruder's transmission region. These monitoring stations each receive signal transmissions from a local region of the wireless network. They process these transmissions and extract attributes of the signals. They then transmit the processed information (signal attributes) to one or more fusion stations. The fusion stations may correlate the calculated attributes with stored attributes of signals of known, authorized users of the network, and transmit alert messages in the case that these signal attributes do not match those of authorized users of the network.

Signal attributes in accordance with the instant invention may include intrinsic signal characteristics, such as the carrier frequency, spurious emissions, and power-on and power-down transients. Also in accordance with the instant invention are methods and systems using both direct and multipath received signal strength (power), signal-to-noise ratio, and geometric characteristics such as direction/angle of arrival (AOA), time of arrival, position/range, time dispersion, Doppler shift and polarization.

Such signal attributes are generally random variables with time-varying statistics. In general, these statistics will change with orientation, position and velocity of transmitter and receiver, motion of objects within propagation channel, and environmental conditions (e.g. precipitation, smoke, etc.) Therefore, specific implementations of this technique will typically require knowledge of the locations and signal characteristics of known, authorized users, and tuning of the algorithms to these specific details of the situation.

An advantage of this technique is the ability to "fingerprint" the signal produced by wireless chips. By analyzing and storing specific attributes of signals produced by specific chips, a new level of robustness against intrusion is provided. Intruders who are using different chips than those of known, authorized users may be detected, even though they may be able to pass undetected through higher layers of the network architecture security structure.

Another advantage of this technique is the capability to identify an intruder by his geographic location. Geometric information may be used to identify an intruder's angle of arrival, range, or other information from which his location may be determined.

Signals originating from a location different than that of known, authorized users may be evidence of an intruder.

DETAILED DESCRIPTION OF EXEMPLARY EMBODIMENTS

Figure 1:
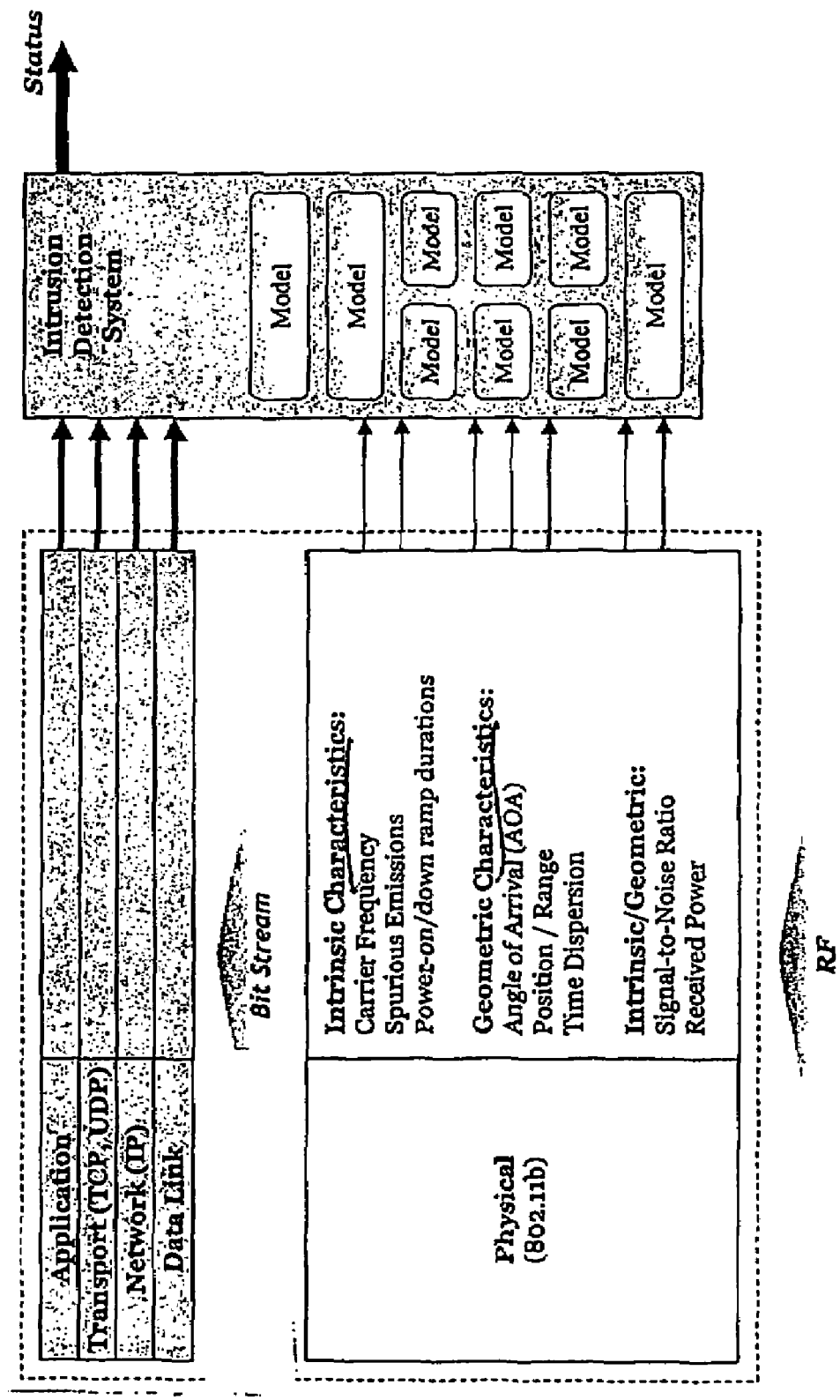
FIG. 1 is a graphical depiction of the layers of a network architecture, and their relationships to an intrusion detection system utilizing physical layer information.

FIG. 1 is a graphical depiction of the layers of a network architecture, and their relationships to an intrusion detection system utilizing physical layer information. The specific example here is of a TCP/IP over radio interface.

Five potential architecture layers are shown in FIG. 1. From top to bottom they can be categorized as the application, transport, network, datalink and physical layers. The focus of the present invention is on the physical layer, and the graphics depicts the analog RF signal entering the physical layer, prior to A/D conversion. The most complete intrusion detection system would gather evidence by utilizing all five of the architecture layers. Information from the various layers is fed into models and a decision is made as to the status of an intrusion.

The present invention is useful in a variety of applications, where datagram and spoofing techniques are a concern. The technique may employ one or more monitoring stations which are distributed across the potential intruder's signal transmission region. These monitoring stations each receive signal transmissions from a local region of the wireless network. They process these transmissions and extract attributes of the signals. They then transmit the processed information (signal attributes) to one or more fusion stations. The fusion stations correlate the calculated attributes with stored attributes of signals of known, or authorized users of the network, and transmit alert messages in the case that these signal attributes do not match those of authorized users of the network.

Figure 2:
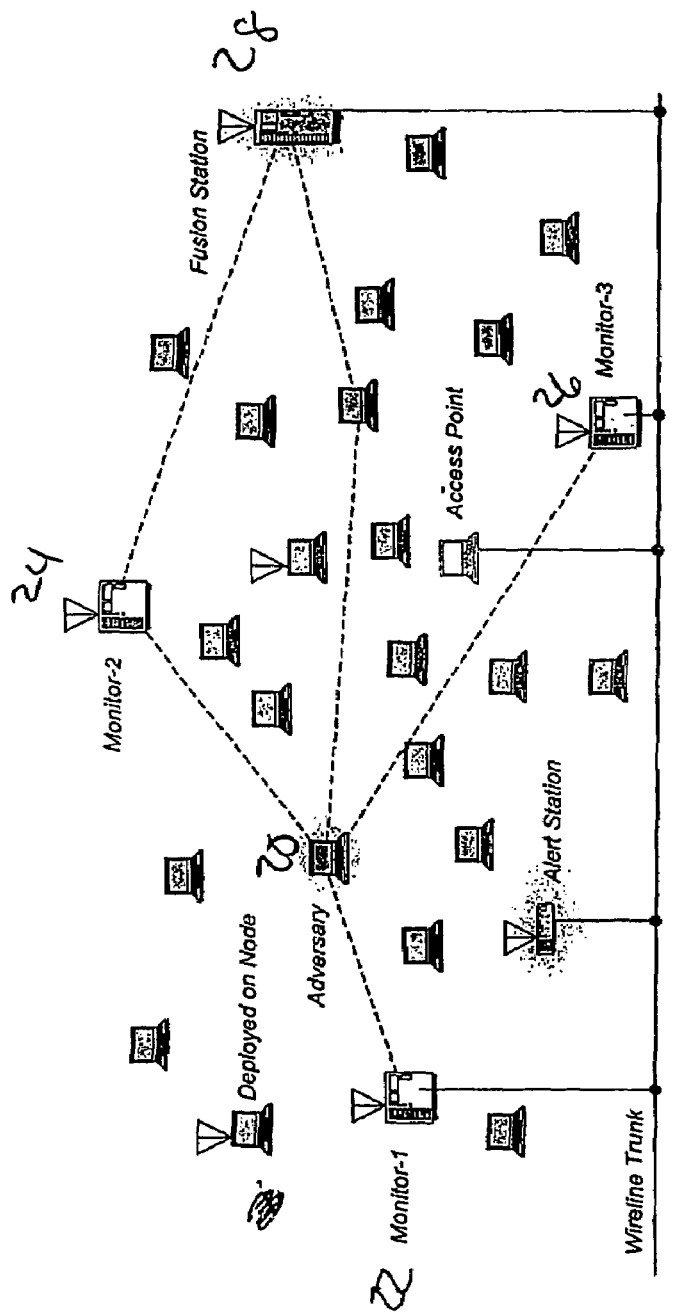
FIG. 2 is a graphical representation of an intrusion detection system in accordance with the present invention.

FIG. 2 is a graphical representation of an intrusion detection system in accordance with the instant invention. Of particular interest to the instant invention are the adversary 20, three monitoring stations 22, 24, 26, and a fusion station 28. The adversary's transmissions may be picked up by one or more monitoring stations, where the RF attributes are estimated and passed to a fusion station. The fusion station correlates this information to detect intrusions. If intrusion is detected, alert packets are sent. Note that this figure is for illustrative purposes only and the number of monitoring stations and fusion stations will vary with the specific network architecture.

In one class of embodiments of the invention, the monitoring stations receive signals corresponding to power-on or power-down transients of the network participants. Attributes computed by the monitoring stations include characteristics of either Fourier or wavelet-based transforms of the power-on or power-down signals. The monitoring stations may transmit these calculated attributes to one or more fusion stations. The fusion stations then compare the Fourier or wavelet characteristics of the received signals with known Fourier or wavelet characteristics of authorized participants on the network. Anomalies, if detected, cause alert messages to be sent, to notify the appropriate persons or systems that an intruder may be present.

Figure 3:
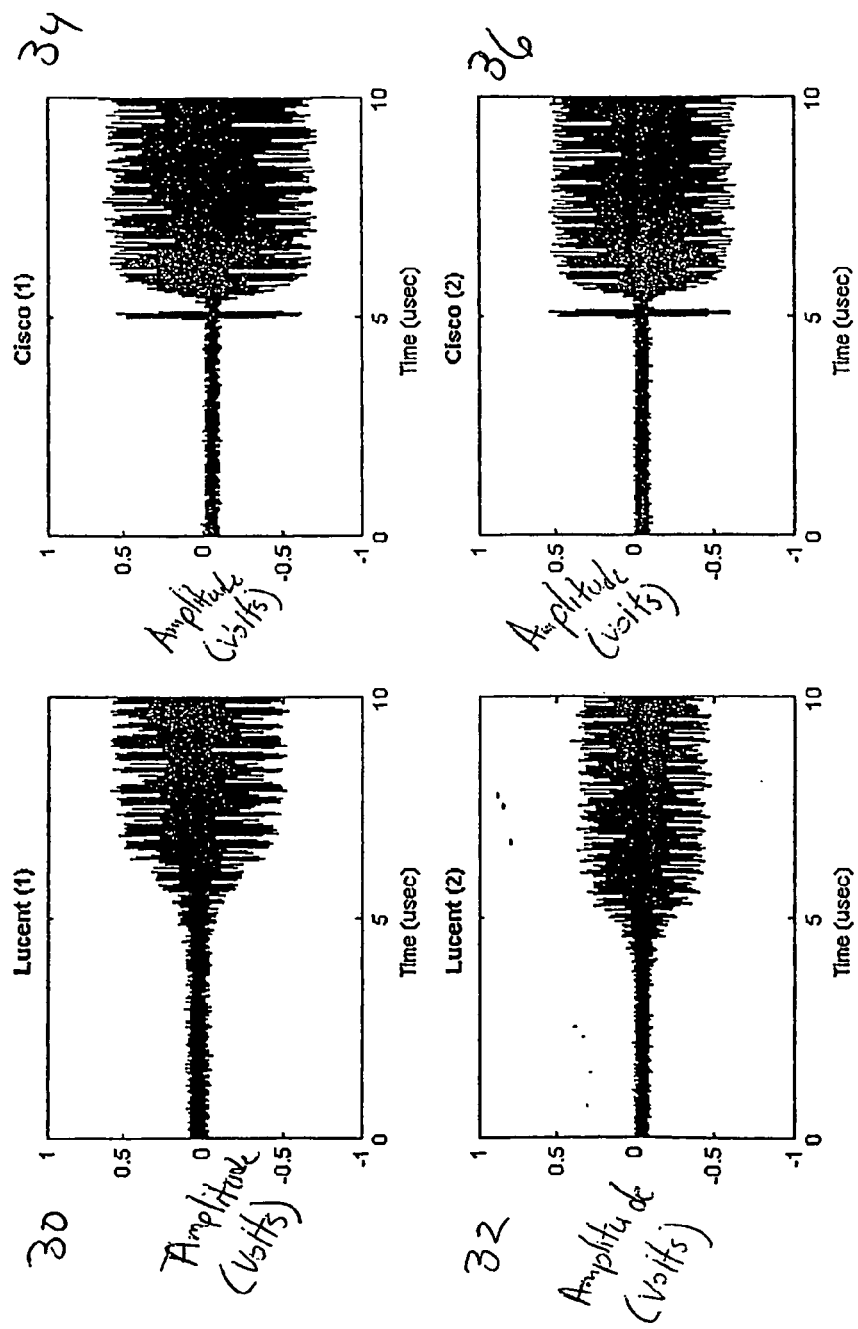
FIG. 3 displays four graphs of power-on transient signals captured from four PC cards.

FIG. 3. Shows four graphs of power-on transient signals captured from four PC cards, two Lucent cards 30, 32 and two Cisco cards 34, 36. The graphs shown were obtained through digitization (at 25 MHz IF) of 50 samples of beacon transmission from each of the four cards.

Figure 4:
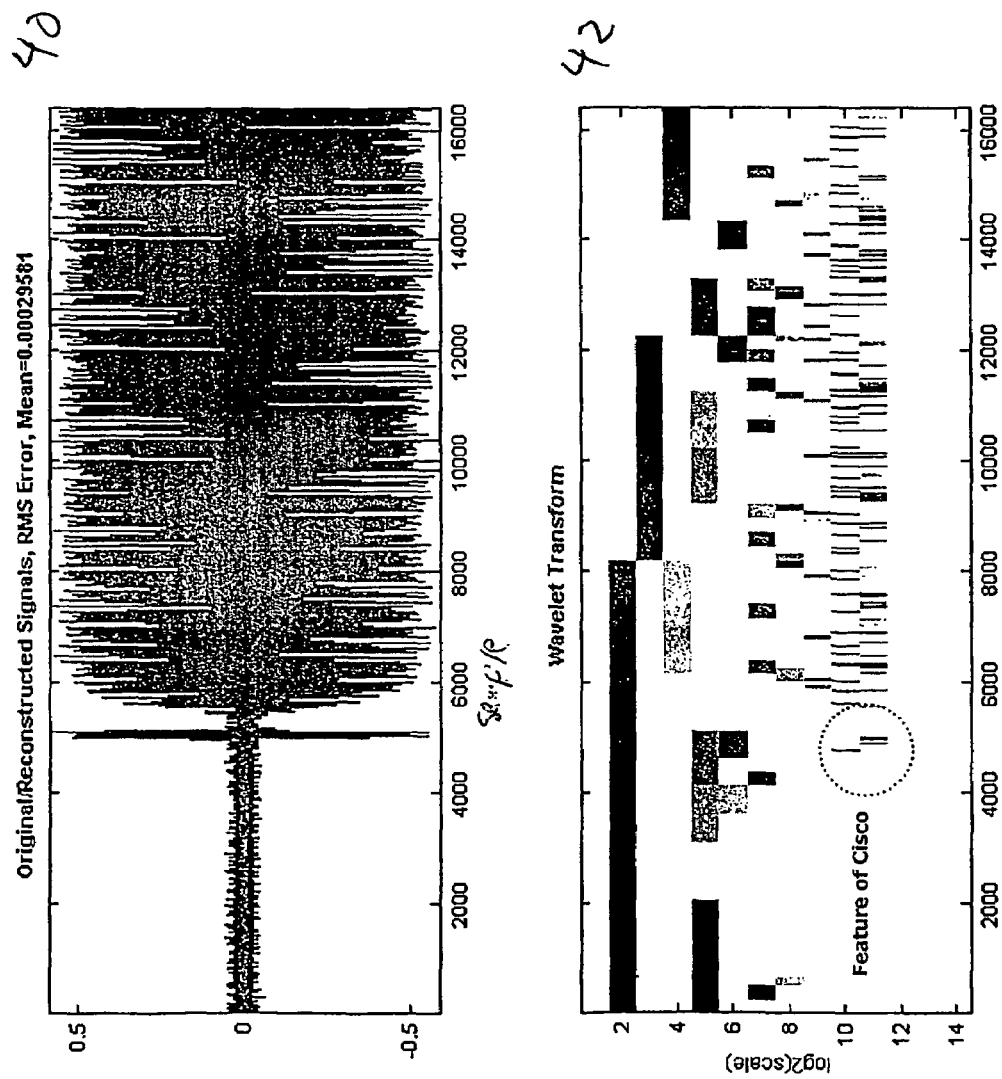
FIG. 4 shows an original/reconstructed signal of a Cisco PC card, and its wavelet transform.

FIG. 4. Shows an original/reconstructed signal of a Cisco PC card 40, and its wavelet transform 42. Of particular note is the feature of the Cisco card obtained through the wavelet transform. This is an example of "fingerprinting" of the cards, which can be used to determine a card which is not from a known, authorized user.

An another embodiment, monitoring stations include a mixer and low power amplifier (LPF) that may obtain an intermediate frequency (IF) signal. Attributes computed by the monitoring stations include statistics on the IF signals in the time domain. These statistics include median, mean and standard deviation. The computed statistics are then transmitted to the fusion station, which compares them to similar stored statistics on signals from known users. Again, anomalies are detected and appropriate authorities are notified.

In another embodiment, attributes computed by the monitoring stations may include direct path received power, and the ratio of (multipath) power received in-chip to direct path received power. These attributes are then transmitted to the fusion station, which compares them to stored statistics on signals from known users. These stored statistics may include the mean, median and standard deviation of the direct path received power and the ratio of (multipath) power received in-chip to direct path received power. Again, anomalies are detected and appropriate authorities are notified.

In another embodiment, attributes computed by the monitoring stations include horizontal polarization and/or vertical polarization, and may also include direction of arrival and/or received power. These attributes are then transmitted to the fusion station, which compares them to stored statistics on signals from known users. These stored statistics may include the mean, median and standard deviation of the horizontal polarization and/or vertical polarization, the direction of arrival and/or received power. Again, anomalies are detected and appropriate authorities may be notified.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A system for detecting intrusion into a wireless network, the system comprising:
   a monitoring station comprising:
      a first transceiver for receiving and demodulating a first signal and for sending a first communication, and
      a first processor coupled to the first transceiver for processing the first signal and for controlling the first transceiver; and
   a fusion station comprising:
      a second transceiver for receiving and demodulating the first communication and for sending a second communication, and
      a second processor coupled to the second transceiver for processing the first communication from the monitoring station and for controlling the second transceiver, wherein
      the second processor stores attributes of an expected signal;
      the first processor calculates attributes of the first signal;
      the first communication contains the attributes of the first signal;
      the second processor compares the attributes of the first signal with the stored attributes of the expected signal to determine whether the attributes of the first signal deviate from the stored attributes of the expected signal; and
      the second communication comprises an alert messages if the attributes of the first signal deviate from the stored attributes of the expected signal.

2. The system of claim 1, wherein the second processor compares a frequency content of power-on transient of the first signal, with a frequency content of power-on transient of the expected signal.

3. The system of claim 1, wherein the second processor compares a stored wavelet transform of power-on transient of the first signal, with a wavelet transform of power-on transient of the expected signal.

4. The system of claim 1, wherein the second processor compares a frequency content of power-down transient of the first signal, with a frequency content of power-down transient of the expected signal.

5. The system of claim 1, wherein the second processor compares a stored wavelet transform of power-down transient of the first signal, with a wavelet transform of power-down transient of the expected signal.

6. The system of claim 1, wherein the second processor compares a median, mean, and standard deviation of an IF signal obtained from the first signal, with a median, mean and standard deviation of an IF signal obtained from the expected signal.

7. The system of claim 1, wherein the second processor compares a direct path received power from the first signal and ratio of (multipath) power received in-chip to the direct path received power from the first signal, with a direct path received power from the expected signal and the ratio of (multipath) power received in-chip to the direct path received power from the expected signal.

8. The system of claim 1, wherein the second processor compares polarization and direction of arrival of the first signal to polarization and direction of arrival of the expected signal.

9. The system of claim 1, wherein the attributes of the first signal are extracted at the physical layer.

10. A method for intrusion detection into a wireless network comprising the steps of:
    storing an attribute of an expected signal;
    monitoring a first signal having attributes:
    receiving and demodulating a first signal having attributes:
    calculating an attribute of the first signal;
    transmitting a first communication containing the attribute of the first signal:
    comparing the attribute of the first signal with the stored attribute of the expected signal to determine whether the attribute of the first signal deviates from the stored attribute of the expected signal; and
    transmitting a second communication comprising an alert message if the attribute of the first signal deviates from the stored attribute of the expected signal.

11. The method of claim 10, wherein the attribute is a frequency content of power-on transient of the signal.

12. The method of claim 10, wherein the attribute is a wavelet transform of power-on transient of the signal.

13. The method of claim 10, wherein the attribute is a frequency content of power-down transient of the signal.

14. The method of claim 10, wherein the attribute is a wavelet transform of power-down transient of the signal.

15. The method of claim 10, wherein the attribute is a calculated median, mean, or standard deviation of an IF signal obtained from the first signal.

16. The method of claim 10, wherein the attribute is a calculated direct path received power from the signal and a ratio of (multipath) power received in-chip to the direct path received power from the signal.

17. The method of claim 10, wherein the attribute is a calculated polarization and direction of arrival of the signal.

18. The method of claim 10, wherein an attribute includes one or more attributes.

19. The method of claim 10, wherein the attributes of the first signal are extracted at the physical layer.

* * * * *